United States Patent [19]

Anders

[11] Patent Number: 5,181,807
[45] Date of Patent: Jan. 26, 1993

[54] FLOATING ACCELERATOR RING

[75] Inventor: Walter G. Anders, North Canton, Ohio

[73] Assignee: Diebold, Incorporated, Canton, Ohio

[21] Appl. No.: 764,755

[22] Filed: Sep. 24, 1991

[51] Int. Cl.$^5$ .............................................. B65G 51/06
[52] U.S. Cl. ..................................................... 406/190
[58] Field of Search ................ 406/190; 277/174, 177, 277/53, 123, 138

[56] References Cited

U.S. PATENT DOCUMENTS 3,787,008  1/1974  Barnett et al. ....................... 406/190
4,042,190  8/1977  Ueno ............................... 406/190 X

*Primary Examiner*—Charles A. Marmor
*Assistant Examiner*—James M. Kannofsky
*Attorney, Agent, or Firm*—D. Peter Hochberg; Mark Kusner

[57] ABSTRACT

An accelerator ring arrangement for use on an article carrier used in a pneumatic transfer system, the system including a transfer tube defining a passage through which the carrier is propelled. The accelerator ring arrangement includes a continuous seal member surrounding the carrier which is operable to form a pneumatic seal thereabout. The seal member has an outer edge dimensioned to generally conform to the cross-sectional profile of the passage. The seal member is mounted to the carrier wherein the seal member is laterally movable relative to the carrier.

19 Claims, 6 Drawing Sheets

FLOATING ACCELERATOR RING

FIELD OF THE INVENTION

The present invention relates generally to pneumatic transfer systems for conveying articles in a carrier through a tube, and more particularly to an accelerator ring assembly for carriers used in such systems.

BACKGROUND OF THE INVENTION

In a typical pneumatic transfer system, an article carrier is propelled between two spaced-apart terminals through an elongated transfer tube by air pressure. The carrier is propelled through the transfer tube by creating a pressure differential across the carrier. In other words, the carrier is propelled forward when a higher air pressure is created behind the carrier than exists in front of it. This may be accomplished by blower systems forcing air into the transfer tube behind the carrier thereby creating an increased pressure behind the carrier, or by reducing the pressure ahead of the carrier by creating a vacuum ahead of the carrier. In either situation, the efficiency of a pneumatic transfer system is directly related to the ability to minimize the air loss, i.e. air "bleed-by", around the carrier. To this end, "accelerator rings" are generally provided to surround and seal the periphery of a carrier to prevent air from "bleeding by" the body of the carrier.

An accelerator ring may be made from a wide variety of materials. The choice of materials used for accelerator rings are generally based upon the size of the carrier and the weight to be carried thereby. In this respect, soft, resilient materials, such as felt or belting, may be used for small diameter carriers transferring relatively small loads. Such materials adapt closely to the inner surface of the transfer tube and are pliable enough to conform to surface irregularities within the tube. Such materials, however, do not provide sufficient load carrying capability when used with large diameter carriers designed for transferring heavy loads, in that such materials wear too rapidly. Accordingly, a more rigid, wear resistent material is generally needed to support the weight of large weight-carrying carriers. For such applications, hard rubber or rubber reinforced leather belting is normally used. While such materials generally provide greater wear resistance, they are typically rigid and inflexible, and cannot readily conform to surface irregularities within the transfer tube. Therefore, when such a rigid material is used, the ring assembly must be dimensioned relative to the inner dimensions of the transfer tube so as not to bind the carrier therein.

In this respect, most transfer tubes are assembled from standard commercially available, metal or plastic tubes. Such tubes are available in various nominal sizes, but are subject to manufacturing tolerances which can vary the inner diameter of such tubes. Moreover, such tubes are generally not perfectly round. In this respect, most nominal sizes of tubing, especially metal tubing, have an "ovality factor", which is a dimension indicative of the degree or amount by which a cylindrical tube may be "out of round".

Accordingly, for large diameter heavy carriers having accelerator rings formed of rigid, generally non-flexible material, the outer diameter of such rings must be dimensioned to pass through a tube manufactured to the smallest tolerance and having the maximum ovality factor. In other words, the outer diameter of the accelerator ring must be dimensioned to pass through the smallest possible cylindrical opening the transfer tube may have as a result of manufacturing limitations.

As will be appreciated, when an accelerator ring is used within a transfer tube manufactured to the lower tolerance, a substantial gap will exist between the outer edge of the accelerator ring and the inner diameter of the transfer tube. Such a gap adversely affects the efficiency of the system by allowing air to "bleed-by" or flow past the carrier thereby reducing the pressure differential across the carrier and reducing the propelling force exerted on the carrier.

The present invention overcomes this and other problems by providing a seal arrangement for a carrier for use in pneumatic transfer system, which seal arrangement increases the efficiency of the transfer system by increasing the permissible size of the seal surrounding a carrier, and as a result reducing the annular gap created between the carrier and the inner surface of the transfer tube.

SUMMARY OF THE INVENTION

In accordance with the present invention, there is provided an accelerator ring arrangement for use on an article carrier used in a pneumatic transfer system, wherein the system includes a transfer tube defining a passage through which the carrier is propelled. The arrangement is comprised of a continuous seal member surrounding the carrier operable to form a pneumatic seal about the carrier in the passage. The seal member has an outer edge dimensioned to generally conform to the cross-sectional profile of the passage and is mounted to the carrier wherein the seal member is laterally movable relative to the carrier.

In accordance with another aspect of the present invention, there is provided a sealing arrangement for a carrier propelled through a tube in a pneumatic transfer system. The sealing arrangement includes at least one fixed seal element fixedly mounted to the carrier having an outer peripheral profile which is dimensioned to conform to, and to be smaller than, the profile defined by the inner surface of the transfer tube. At least one floating seal element is mounted to the carrier for lateral movement relative thereto. The floating seal element has an outer peripheral profile which is dimensioned to conform to the profile defined by the inner surface of the tube and is larger than the profile of the fixed seal element and smaller than the profile of the tube.

In accordance with another aspect of the present invention, there is provided an article carrier adapted to be propelled through a transfer tube in a pneumatic transfer system. The carrier includes a tubular body portion which is generally symmetrical about a central axis, the body portion defining an article-carrying chamber therein. An outward opening slot is formed on the outer surface of the body portion about the periphery thereof. The slot is oriented in a plane generally perpendicular to the central axis of the body portion. A continuous seal member surrounds the body portion and is operable to form a pneumatic seal about the body portion. The seal member has an outer edge dimensioned to generally conform to the profile of the inner surface of the transfer tube and an inner edge dimensioned to be received within the slot and is movable in the slot in the plane such that the seal member is laterally movable relative to the axis of the body portion.

It is an object of the present invention to provide a seal arrangement for sealing the periphery of an article carrier conveyed through a tube in a pneumatic transfer system.

Another object of the present invention is to provide a seal arrangement for sealing the periphery of an article carrier conveyed through a tube in a pneumatic transfer system which increases the efficiency of such system by reducing air flow around the carrier.

Another object of the present invention is to provide a seal arrangement as described above which reduces the gap between the carrier and the inner surface of the transfer tube.

A still further object of the present invention is to provide a seal for a carrier in a pneumatic transfer system wherein the position of the seal relative to the carrier is movable.

A still further object of the present invention is to provide a seal as described above wherein the seal maintains a generally central position within the transfer tube.

A still further object of the present invention is to provide a seal as defined above wherein the seal is laterally movable relative to the axis of the carrier.

A still further object of the present invention is to provide a seal as described above, which seal is flexible to compensate for surface imperfections within the surface of the transfer tube.

A still further object of the present invention is to provide a seal arrangement as described above wherein the seal generally maintains its position relative to the tube irrespective of the lateral position of the carrier.

Another object of the present invention is to provide a seal arrangement as defined above which can shift laterally with respect to the carrier when in contact with the inner surface of the tube.

A still further object of the present invention is to provide a seal arrangement for sealing an end cover to a hollow carrier body.

Another object of the present invention is to provide a seal arrangement as defined above wherein air flow through the carrier body is reduced.

These and other objects and advantages will become apparent from the following description of a preferred embodiment of the invention taken together with the accompanying drawings.

BRIEF DESCRIPTION OF THE DRAWINGS

The invention may take form in certain parts and arrangement of parts, a preferred embodiment of which will be described in detail in the specification and illustrated in the accompanying drawings wherein.

DETAILED DESCRIPTION OF A PREFERRED EMBODIMENT

Figure 1:
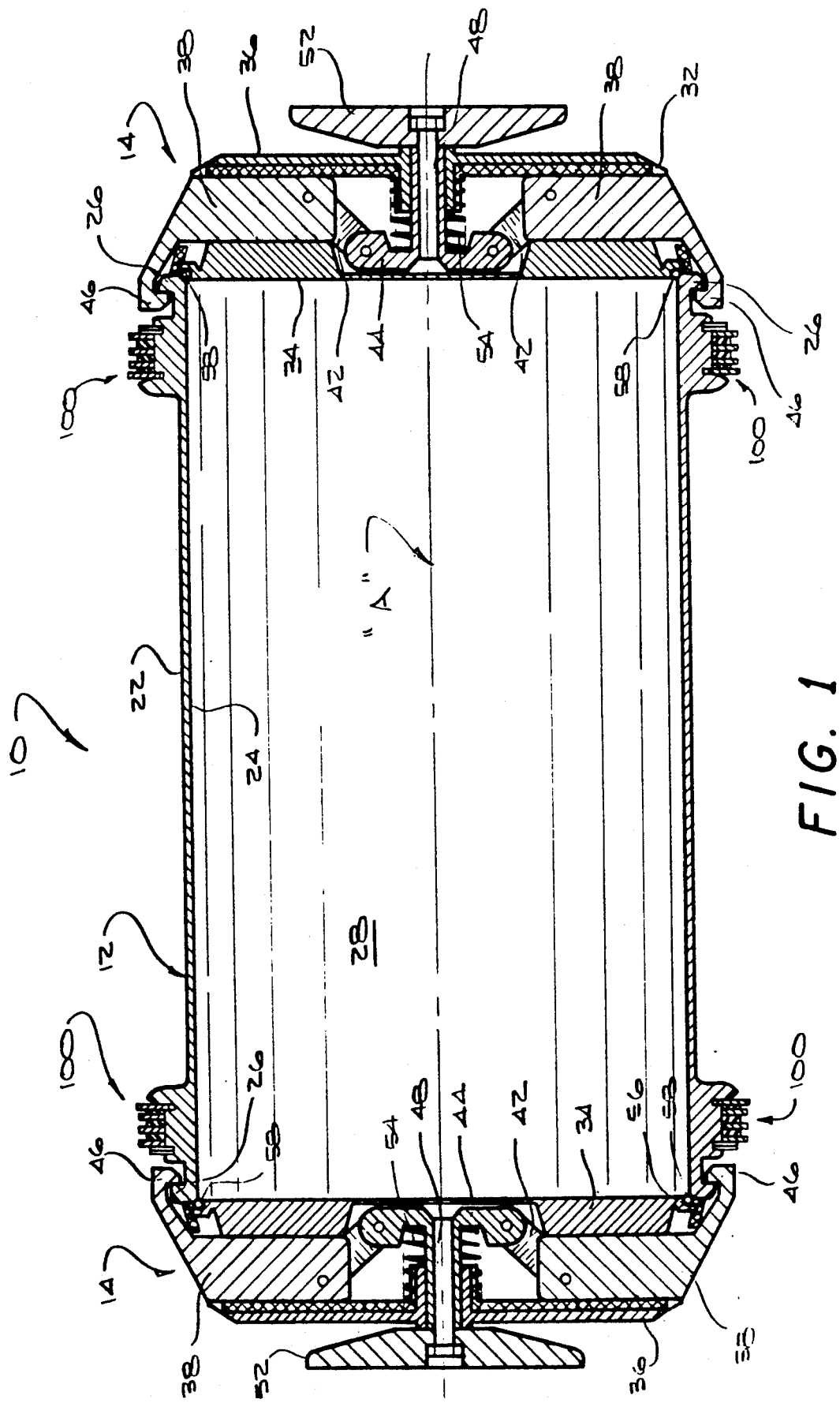
FIG. 1 is a sectional view of a carrier for a pneumatic transfer system illustrating a preferred embodiment of the present invention.

Referring now to the drawings wherein the showings are for the purpose of illustrating a preferred embodiment of the invention only and not for the purpose of limiting same, FIG. 1 shows a carrier 10 for use in a pneumatic transfer system. In the embodiment shown, carrier 10 is generally comprised of a cylindrical body portion 12 having removable end covers 14 mounted thereto. Body portion 12 is generally symmetrical about a central axis, designated "A" in the drawings, and has an outer surface 22, an inner surface 24, and outward extending annular flanges 26 formed at the ends thereof. Inner surface 24 defines an inner article carrying cavity or chamber 28 within body portion 12.

End covers 14 in and of themselves form no part of the present invention and therefore, shall not be described in great detail. Each end cover is identical to the other and is basically comprised of a housing 32 having an inner plate 34 and an outer plate 36 mounted thereto. A plurality of movable clamping elements 38 are connected by links 42 to an actuating element 44. Clamping elements 38 have generally hook-shaped end portions 46 which are dimensioned to grip flange 26 on body portion 12, as seen in FIG. 1. Actuating element 44 includes a stem 48 which extends through housing 32 and outer plate 36 and is connected to a disk 52. A helical spring 54 biases actuating elements 44 and clamping elements 38 to a position shown in FIG. 1 wherein hook-shaped end portions 46 of clamping elements 38 grip flange 26 on body portion 12 to secure end covers 14 thereto.

According to one aspect of the present invention, to prevent air flow into and through chamber 28 of body portion 12, a seal arrangement is formed between end covers 14 and body portion 12. In the embodiment shown, inner plate 34 of each cover 14 includes a notch 56 formed in the outer peripheral edge thereof. Notch 56 is dimensioned to receive a seal 58 therein. In the embodiment shown, seal 58 is an O-ring formed from a resilient material and is dimensioned to mate with and seal the ends of body portion 12.

Figure 2:
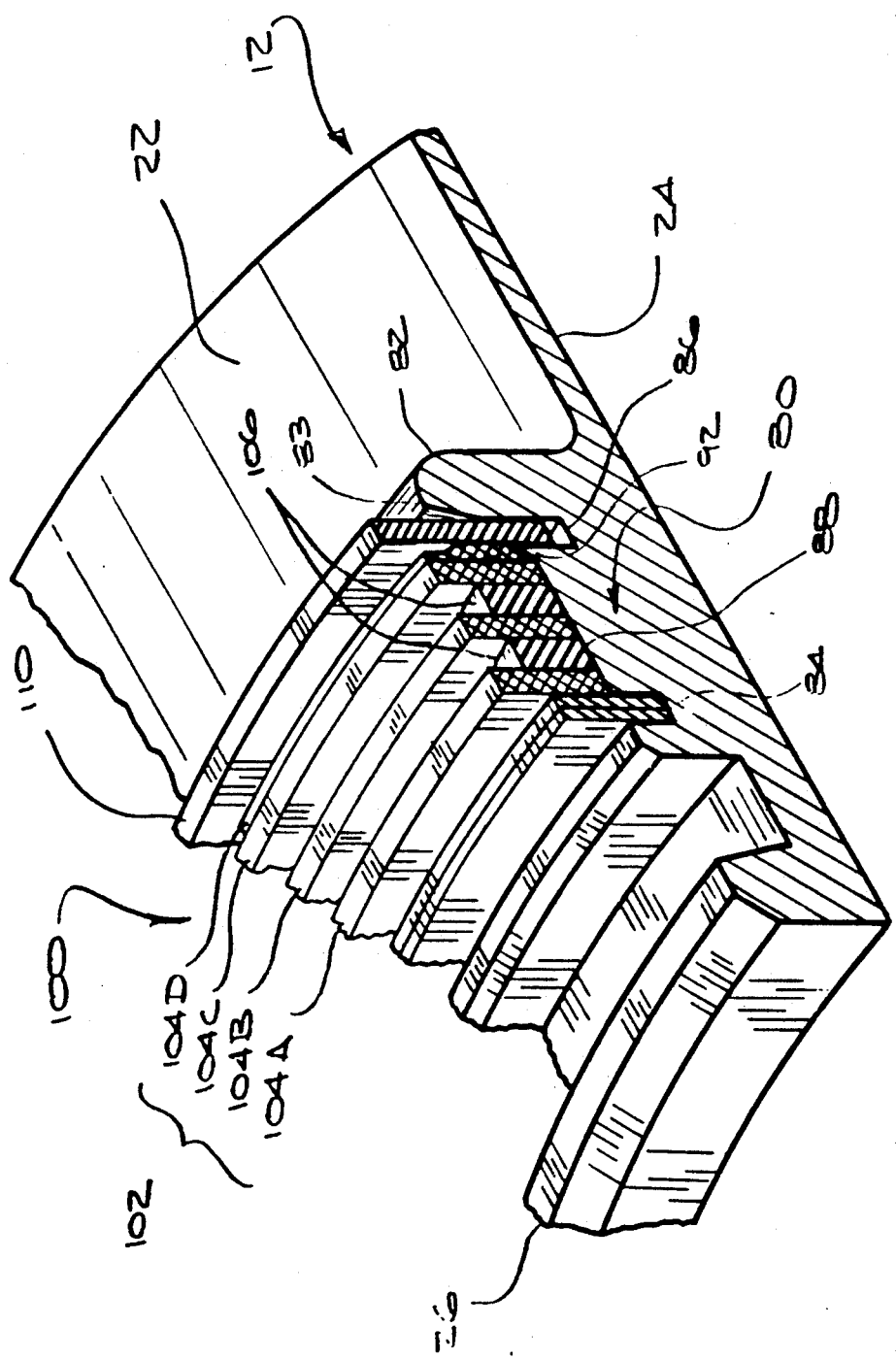
FIG. 2 is an enlarged, prospective view showing a section of the carrier shown in FIG. 1 illustrating a seal arrangement according to a preferred embodiment of the present invention.
Figure 3:
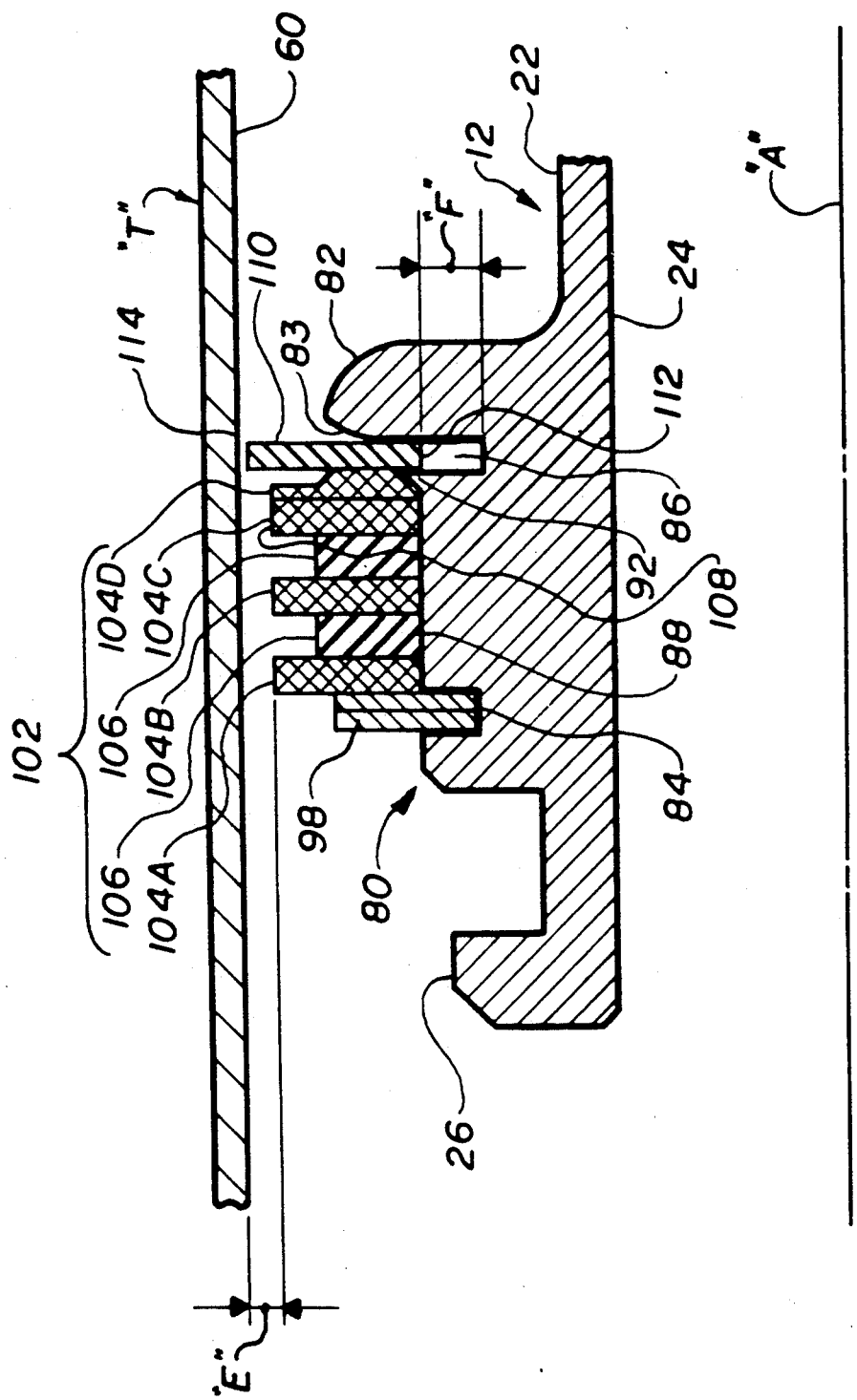
FIG. 3 is a side sectional view of the seal arrangement shown in FIG. 2 showing the seal arrangement positioned within a transfer tube of a pneumatic transfer system.

According to another aspect of the present invention, accelerator ring assemblies 100 are provided adjacent each end of body portion 12. Accelerator ring assemblies 100 basically form a seal between cylindrical body portion 12 of carrier 10 and the inner surface of a transfer tube, designated "T" in the drawings, through which carrier 10 is to be conveyed. Ring assemblies 100 are identical and therefore only one shall be described in detail. In the embodiment shown, ring assembly 100, best illustrated in FIGS. 2 and 3, is positioned upon an annular mounting boss 80 which is formed on body portion 12 and projects outward therefrom such that ring assembly 100 extends about the periphery of carrier 10. An enlarged retainer wall 82 is formed along one side of mounting boss 80. The upper, outer end of retainer wall 82 includes a rounded surface 83. Two spaced-apart, parallel slots 84, 86 are formed in mounting boss 80 and define an annular mounting surface 88 therebetween. In this respect, slots 84, 86 extend about body portion 12 of carrier 10. A lip 92 (best seen in FIGS. 2 and 3) is formed along the edge of mounting surface 88 adjacent slot 86.

Mounting surface 88 is dimensioned to receive a stationary accelerator ring 102. In the embodiment shown, accelerator ring 102 is comprised of four, side-by-side annular elements 104A, 104B, 104C and 104D which are bound together in a common matrix binder 106. In the embodiment shown, elements 104A, 104B, 104C and 104D are generally flat, annular rings formed of a generally flexible belting material secured together in a rigid, hard rubber matrix 106. In this respect, primary accelerator ring 102 is generally rigid and inflexible. As best seen in FIG. 3, a portion of the outer edges of elements 104A, 104B, 104C and 104D extend beyond matrix 106 to provide wear surfaces and to prevent matrix 106 from coming in contact with the inner surface of the transfer tube wall. As best seen in FIG. 3, element 104D is chamfered to receive lip 92 formed along the edge of mounting surface 88. The upper, i.e. outer, edge of element 104D is formed to have a contoured outer surface as shown in the drawings.

Primary accelerator ring 102 is generally rigid and is dimensioned to be fixedly mounted to mounting surface 88 of body portion 12 so as to be stationary relative thereto. In this respect, the inner diameter of primary accelerator ring 102 closely approximates the outer diameter of annular mounting surface 88 so as to be snugly mounted thereto so as to prevent air flow, i.e. air bleed-by therebetween. Primary accelerator ring 102 is generally maintained on mounting surface 88 by lip 92 and by helical retainer ring 98. To this end, the chamfered inner edge of primary accelerator ring 102 receives lip 92, which prevents movement of primary accelerator ring in that direction.

According to the present invention, stationary primary accelerator ring or seal 102 extends about the periphery of carrier 10 and has an outer peripheral edge 108 which is dimensioned to confirm in shape to inner surface 60 of tube T through which carrier 10 is to be conveyed. In other words, the profile of primary accelerator ring or seal 102 conforms in shape to the profile defined by inner surface 60 of transfer tube T. Primary accelerator ring 102 has an outer annular diameter dimensioned to be equal to or less than the smallest circular opening defined by the transfer tube of the pneumatic system. In this respect, the smallest circular opening within the transfer tube will typically be its nominal standard inner diameter (the "standard" inner diameter being an industry standard dimension for a tube of a specific size) less a tolerance attributable to manufacturing limitations and further reduced by a "ovality factor" which is a dimension indicative of the amount that the circular tube may be "out of round". Described another way, "ovality" defines the amount by which the sides of the circular transfer tube may vary from a true circle. In this respect, opposed sides of the tube may be closer together or further apart from a true circle, thereby producing a slightly oval opening. To ensure that carrier 10 does not bind within such opening, primary accelerator ring 102 is dimensioned to have an outer diameter which is smaller than the closest sides of the oval opening.

For example, in the present invention, carrier 10 is dimensioned for use in a standard 8" diameter tube. Such tube has a nominal outer diameter of 8" and a tube wall thickness of approximately 0.160", which defines a tube inner diameter of about 7.840". The tube's inner diameter is subject to a manufacturing tolerance of 0.030" which means that the tube's inner diameter can vary from an oversized diameter of 7.870" to an undersized diameter of 7.810". As used hereinafter, the term "undersized diameter" shall refer to a standard nominal inner diameter of a tube less a manufacturing tolerance.

The ovality of such a tube may be 0.078", which means that an undersized diameter tube may further be reduced by 0.078" to define a side-to-side tube opening of 7.732". In this respect, primary accelerator ring 102 is preferably dimensioned to have an outer diameter of less than 7.732" which, as stated above, is the tube's nominal inner diameter less a manufacturer's tolerance and less an ovality factor. According to the present invention, the outer diameter of primary accelerator ring 102 is preferably between 0.020" and 0.030" smaller than the smallest opening through the transfer tube to ensure that primary accelerator ring 102 on carrier 10 does not bind within the transfer tube in the event that a surface imperfection, such as a "dink" or "crease" exists in the wall of the transfer tube.

According to the present invention, in addition to primary accelerator ring 102, a secondary accelerator ring 110 is provided. Secondary accelerator ring 110 is disposed between primary accelerator ring 102 and retaining wall 82. In the embodiment shown, secondary accelerator ring 110 is generally a flat, cylindrical element having an annular inner edge 112 dimensioned to be received within slot 86. As best illustrated in FIG. 3, secondary accelerator ring 110 is dimensioned to be received within slot 86 and to be movable therein. According to the present invention, secondary accelerator ring 110 has an inner diameter which is greater than the outer diameter of the base of slot 86. Secondary accelerator ring 110 is thus able to move within slot 86 relative to axis "A" of carrier 10 in a plane perpendicular to axis "A". In this respect, according to the present invention, secondary accelerator ring 110 is adapted to "float" relative to body portion 12 of carrier 10 such that it generally maintains a central or centered position within the transfer tube irrespective of the position of the body portion 12 relative thereto. By maintaining a centered position, secondary accelerator ring 110 is able to prevent air blow-by around the carrier. To this end, it is desirable to maximize the outer diameter of secondary accelerator ring 110 while at the same time permitting sufficient freedom of motion of accelerator ring 110 relative to body portion 12 to compensate for lateral motion of carrier body 12 within the transfer tube. Accordingly, the outer diameter of secondary accelerator ring 10, as well as the extent to which secondary accelerator ring 110 is permitted to float on body portion 12, is related to the diameter of the primary accelerator ring 102. In this respect, the outer diameter of primary accelerator ring 102 and the diameter of the transfer tube determines the amount to which carrier 10 may move laterally within the tube. It is therefore desirable to dimension secondary accelerator ring 110 to compensate for the gap created by necessarily smaller diametered primary accelerator ring 102.

Figure 7:
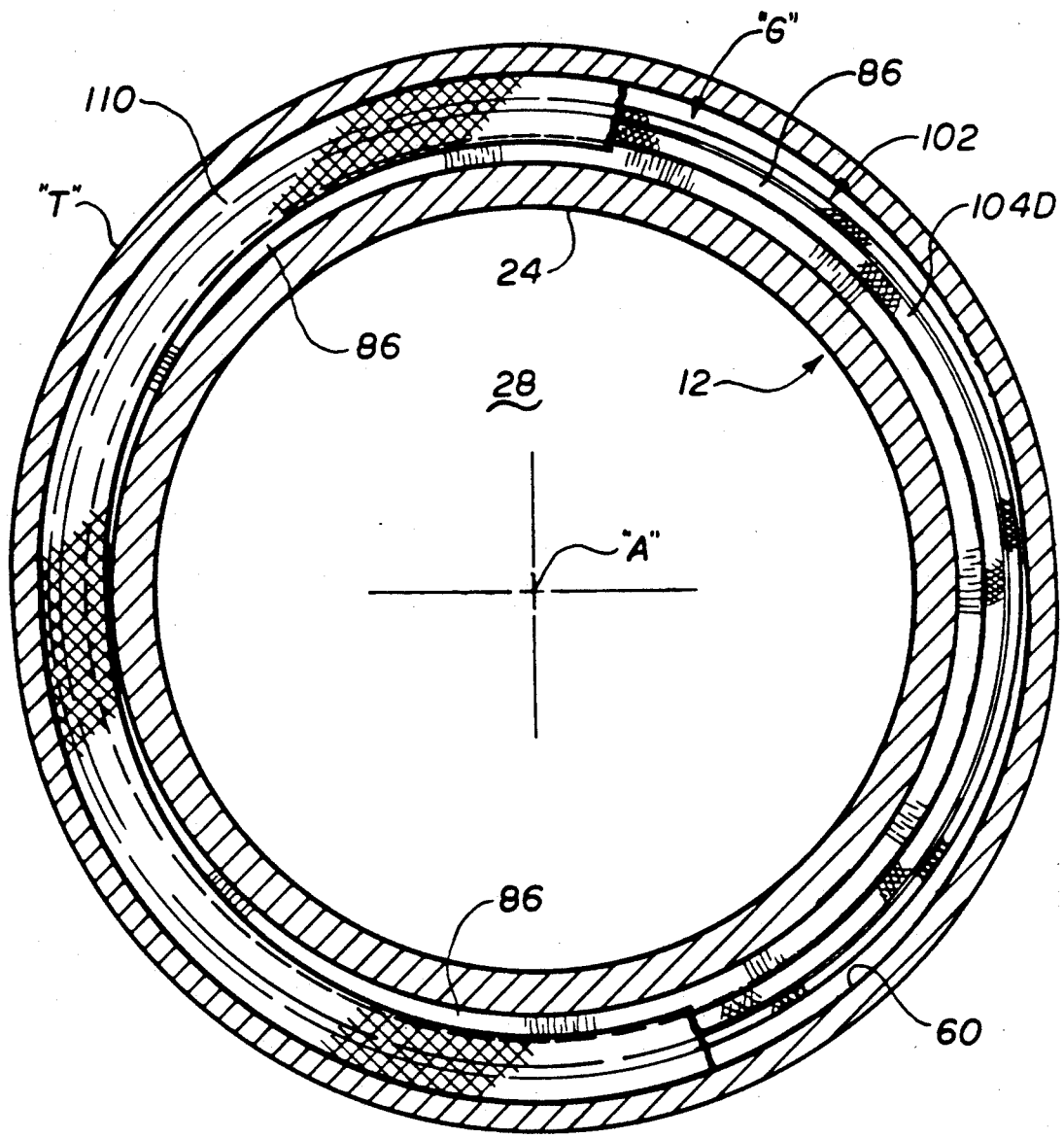
FIG. 7 is a sectional view taken along lines 7—7 of FIG. 6 illustrating a seal arrangement of the present invention in an "out-of-round" oval transfer tube.

According to the present invention, secondary accelerator ring 110 is dimensioned to conform in shape to the profile defined by inner surface 60 of the tube T through which carrier 10 is to be conveyed. Importantly, secondary accelerator ring 110 has an outer peripheral edge 114 has a profile that is larger in perimeter than the perimeter of the profile of the outer peripheral edge 108 of the stationary, primary accelerator ring 102. The profile of outer peripheral edge 114 of secondary accelerator ring 102, however has a perimeter that is equal to or smaller than that of the profile of inner surface 60 of tube T. To this end, secondary accelerator ring 110 has an outer diameter slightly larger than the outer diameter of primary accelerator ring 102. Specifically, the outer diameter of secondary accelerator ring 110 is preferably equal to or less than the "undersized diameter" of the transfer tube. With respect to the extent to which secondary accelerator ring may float on body portion 12, the inner edge of secondary accelerator ring 110 and the base diameter of slot 86 are preferably dimensioned such that the annular gap or spacing defined therebetween is equal to at least one-half of the "ovality factor" for the given transfer tube. In this respect, not only can secondary accelerator ring move laterally relative to body portion 12 of carrier 10, but as shown in FIG. 7 (which shall be described in greater detail) secondary accelerator ring 110 may be deformed from a true circle to an oval shape in that its opposite sides are free to collapse into slot 86. In this respect, so long as slot 86 is dimensioned to provide sufficient space for secondary accelerator ring 110 to collapse and conform to the ovality of the transfer tube, the outer diameter of the secondary accelerator ring may be equal to the "undersized diameter" of a nominal size transfer tube. Thus, when necessary, a floating accelerator ring 110 having an outer diameter equalling the inner diameter of the transfer tube may compensate for the ovality in the tube by collapsing within slot 86. With respect to the range of movement of secondary accelerator ring 110 relative to primary accelerator ring 102, it is preferable that the range of travel be at least equal to the difference in the radii of rings 102, 110 such that floating secondary accelerator ring 110 may move sufficiently to ensure that the weight of carrier 10 is borne by primary accelerator ring 102 as said carrier is conveyed through the transfer tube.

Also important with respect to the present invention is that the inner edge of secondary accelerator ring 110 be confined so as to prevent air flow therearound. In the embodiment shown, secondary accelerator ring 110 is generally confined within slot 86 between primary accelerator ring 102 and retaining wall 82. In this respect, secondary accelerator ring 110 is dimensioned to have a thickness closely approximating the width of slot 86 and the spacing between primary accelerator ring 102 and retaining wall 82 such that secondary accelerator ring 110 is freely movable therebetween yet air flow about the inner edge thereof is minimal. Importantly, the outer edge of secondary accelerator ring 110 is preferably flexible to accommodate imperfections within the inner surface of the transfer tube. To facilitate bending or flexing of secondary accelerator ring 102, retaining wall 82 includes a rounded edge 83 and the outer edge of element 104D of primary accelerator ring 102 is dimensioned to facilitate flexing of secondary accelerator ring 110 as indicated above.

To accomplish the foregoing, secondary accelerator 110 is preferably formed of a resilient pliable belting material wherein it may elastically conform to an oval shape to compensate for imperfections in a transfer tube. In the embodiment shown, secondary accelerator ring 110 is formed from Burrell belting having a thickness of approximately 0.062" which provides a secondary accelerator ring having sufficient resiliency to deflect when encountering a surface imperfection within the tube, yet having sufficient rigidity to maintain its generally planar configuration when subjected to air pressure on either side thereof.

Figure 5:
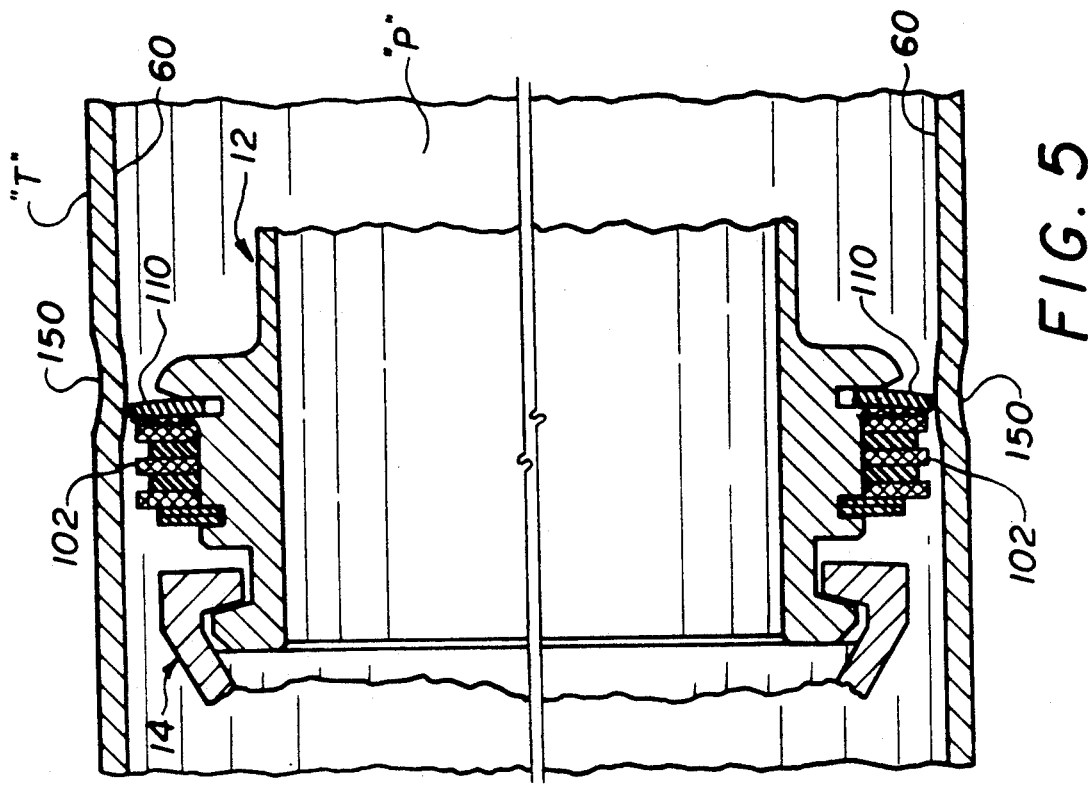
FIGS. 4, 5 and 6 are sectional views of a seal arrangement according to the present invention illustrating the operation thereof within a transfer tube of a pneumatic transfer system.
Figure 4:
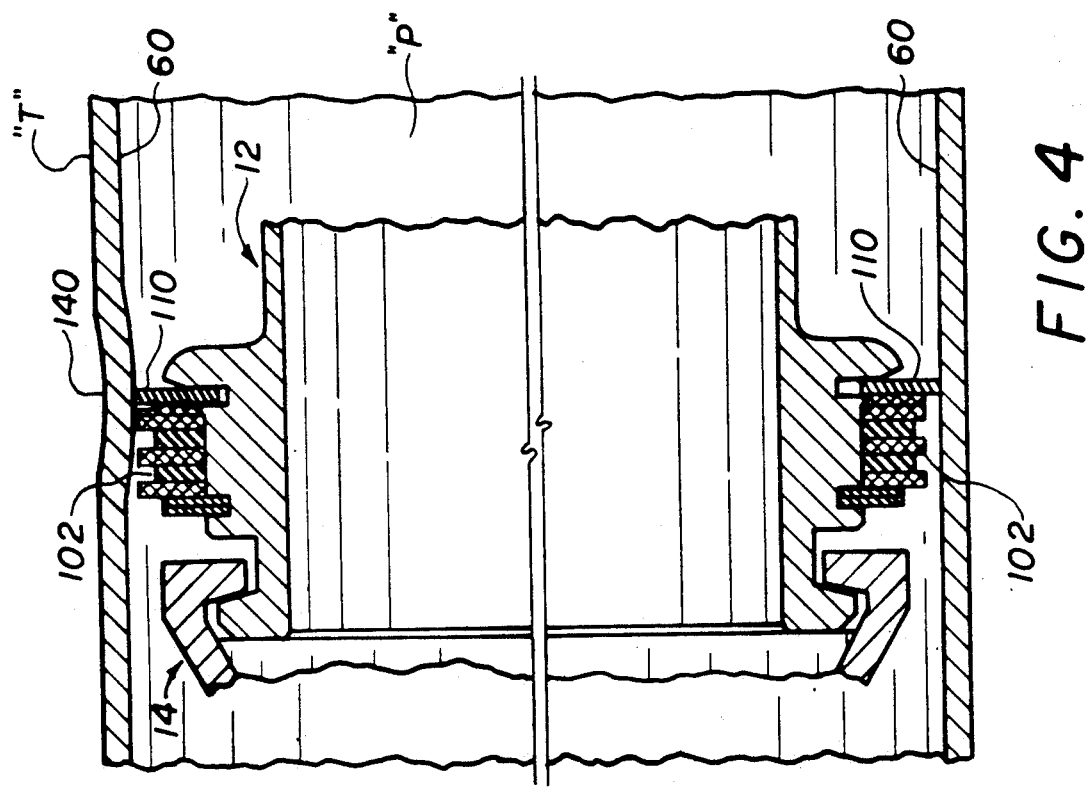

Referring now to FIGS. 4, 5, 6 and 7, operation of the present invention is shown. FIGS. 4 and 5 show a transfer tube, designated "T" in the drawings, for a pneumatic transfer system, which transfer tube "T" defines a passage "P" through which carrier 10 is dimensioned to travel. FIG. 4 illustrates a situation wherein the transfer tube "T" may have localized surface imperfection such as a "dink" 140 wherein a portion of transfer tube wall projects slightly inward into the transfer tube passage "P". As indicated above, primary accelerator ring 102 is dimensioned to ensure that it clears such an obstruction so as to prevent binding of carrier 10 within transfer tube T. As a result of its sizing, a gap is defined between the outer edge of primary accelerator ring 102 and the inner surface of transfer tube "T", through which air can flow and reduce the efficiency of the transfer system. Because secondary accelerator ring 110 has a greater diameter than primary accelerator ring 102, it reduces the annular gap around the carrier 10. More importantly, as shown in FIG. 4, second accelerator ring 110 is movable laterally relative to the axis of carrier 10 to compensate for imperfection 140 within the transfer tube, and this can shift to one side when encountering an obstruction within transfer tube "T". In this respect, the ability of secondary accelerator ring 110 to shift or "float" to one side prevents it from possibly binding against surface imperfection 140.

FIG. 5 illustrates a situation wherein the transfer tube "T" may have surface imperfections 150 which reduce the opening of passageway "P" to a dimension smaller than the outer diameter of secondary accelerator ring 110. In such situations, the resiliency of accelerator ring 110 enables it to flex slightly to bypass such imperfections 150 and to avoid binding carrier 10 within transfer tube "T". In this respect, rounded surface 83 of retainer wall 82 and the contoured outer edge of element 104D permit the outer edge of secondary accelerator ring 110 to move, i.e. deflect, from one side or the other to a limited extent, if second accelerator ring 110 encounters an obstruction with passage "P" of transfer tube "T".

In FIGS. 4 and 5, carrier 10 is shown centrally positioned with transfer tube "T" to illustrate several features to the present invention. In reality, a carrier 10 propelled through transfer tube "T" will typically move laterally from side-to-side within transfer tube "T" as a result of its momentum and directional changes of the transfer tube "T". Moreover, in large carriers dimensioned to carry heavy loads in the range of 30 to 40 pounds, when moving through long horizontal runs, such carrier 10 would typically ride along the lower surface of the transfer tube "T".

Figure 6:
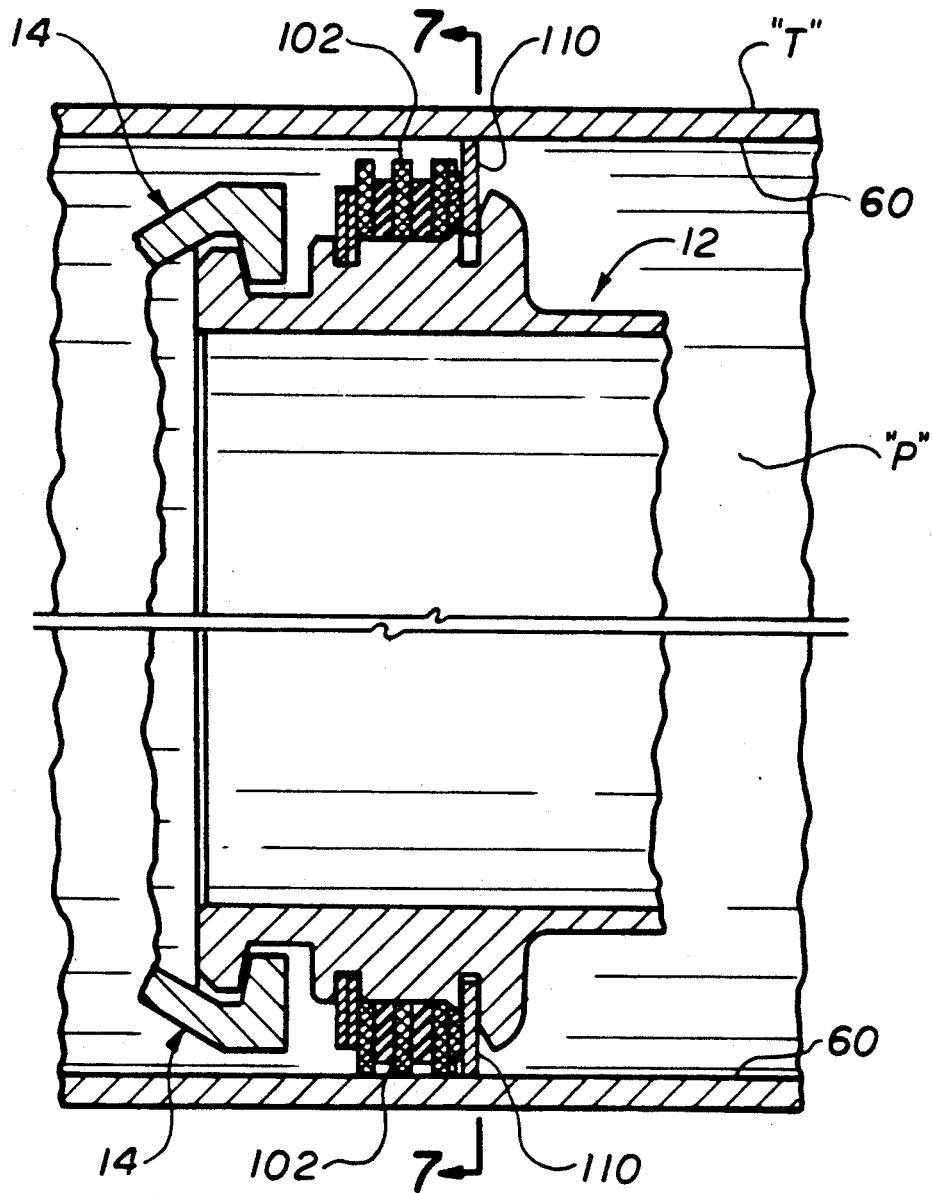

FIG. 6 illustrates the situation wherein body portion 12 and carrier 10 may be against the side of transfer tube "T", for example, when moving along a horizontal run as described above. As seen in FIG. 6, in such situation, carrier 10 rides on the inner surface of transfer tube "T" on primary accelerator ring 102. Secondary accelerator ring 110 is able to shift, i.e. "float", upward into the gap or opening formed above carrier 10. Importantly, by being able to shift, i.e. float, relative to carrier 10, secondary accelerator ring 110 maintains a generally centered or central position within passage "P" irrespective of the position of carrier 10 within transfer tube "T". In this respect, while secondary accelerator ring 110 has a larger diameter than primary accelerator ring 102, it does not bear the load or weight of carrier 10. It thus extends outward beyond primary accelerator ring 102 and provides greater sealing around carrier 10, but does not bear the load of carrier 10 and does not wear rapidly. Moreover, as primary accelerator ring 102 wears, secondary accelerator ring 110 compensates for the ever growing gap formed between the outer edge of primary accelerator ring 102 and the inner surface of transfer tube "T".

In addition to its ability to shift or float relative to carrier 10, according to the present invention, secondary accelerator ring 110 can also compensator for the "ovality" of a transfer tube "T". In this respect, FIG. 7 is a cross sectional view through a transfer tube "T" looking along axis "A" of carrier 10 viewing secondary accelerator ring 110 with primary accelerator ring 102 behind it. FIG. 7 shows an "undersized diameter" tube which is "out-of-round", i.e. the sides of the tube are closer together than the top and bottom of the tube. The left hand side of FIG. 7 shows a secondary accelerator ring 110 according to the present invention which is dimensioned to have an outer diameter approximately equal to the normal inner diameter of the transfer tube "T". On the right hand side of FIG. 7, secondary accelerator ring 110 is broken away showing carrier body portion 12, slot 86 formed therein, and primary accelerator ring 102. As illustrated in FIG. 7, carrier body portion 12 and primary accelerator ring 102 are circular in shape. Primary accelerator ring 102 as indicated above, is specifically dimensioned to have an outer diameter which is smaller than the smallest possible opening in transfer tube "T" to ensure that it will pass through an out-of-round or oval transfer tube "T". The spacing or gap defined between the outer edge of primary accelerator ring 102 and the inner surface of transfer "T" is designated "G" in FIG. 7. As seen in FIG. 7, gap "G" is smallest at the side of transfer tube "T" where the opposite walls of transfer tube "T" are closest together and widen at the top and bottom of tube "T" where the opposite walls are further apart.

Referring now to the left side of FIG. 7, it is shown how secondary accelerator ring 110 deforms to adjust to the ovality of transfer tube "T". Specifically, the sides of secondary accelerator ring 110 shift inward in slot 86 toward the center of carrier 10 while the top and bottom of secondary accelerator ring 110 bow outward away from the center of carrier 10 to conform to the shape of passage "P". Importantly, slot 86 is dimensioned to retain such that the inner edge of secondary accelerator ring 110 is retained therein to prevent air flow therearound. As seen, the outer edge of secondary accelerator ring 110 effectively eliminates gap "G" around primary accelerator ring 102 and thereby reduces air flow or bleed-by around carrier 10, which thus increases the efficiency of the system.

FIG. 7 illustrates a maximum sized secondary accelerator ring 110, i.e. one which has an outer diameter equal or slightly less than the inner diameter of an "undersized diameter" of transfer tube "T". When a secondary accelerator ring 110 is dimensioned to be near or at the smallest diameter of transfer tube "T", i.e. a tube manufactured to the lowest tolerance, it is desirable that slot 86 and secondary accelerator ring 110 be dimensioned such that sufficient spacing exist between the inner edge of secondary accelerator ring 110 and the root or base of slot 86 to ensure the secondary accelerator ring 110 is able to deform to the maximum ovality of transfer tube "T" and that secondary accelerator ring 110 has sufficient range of floating motion relative to carrier 10 to ensure that the load of carrier 10 is borne by primary accelerator ring 102. It will of course be appreciated that such dimensions may vary depending on the "ovality" factor of a given transfer tube "T" and the difference between the outer diameters of primary accelerator ring 102 and secondary accelerator ring 110. In this respect, FIG. 3 illustrates the relative position of primary accelerator ring 102 and secondary accelerator ring 110 relative to the inner surface of transfer tube "T" and carrier 10. In FIG. 3, the axes of carrier 10, secondary accelerator ring 110 and transfer tube "T" are coaligned and "E" designates the resulting spacing between the outer peripheral edge of primary accelerator ring 102 and the inner surface of transfer tube "T", and "F" designates the resulting spacing between the inner edge of secondary accelerator ring 110 and the root or base of slot 86. So long as spacing "F" is equal to or greater than spacing "E", secondary accelerator ring 110 may have an outer diameter equal to the inner diameter of transfer tube "T" and still not be the load bearing ring for carrier 10. As will be appreciated from FIG. 3, as the difference between the outer diameter of primary accelerator ring 102 and secondary accelerator ring 110 decreases, the spacing "F" ensures that the weight of carrier 10 borne by primary accelerator ring 102 likewise decreases.

The present invention thus provides a "floating" accelerator ring for use on carriers used in pneumatic transfer systems, which ring reduces air flow around the carrier by increasing an accelerator ring's permissible diameter. In this respect, the diameter of a ring according to the present invention is not limited by manufacturing variations or defects in the transfer tube.

Importantly, in this respect, while the present invention has been described in the context of a large diameter, heavy load carrying carrier, and the embodiment disclosed has been discussed in the context of a transfer tube subject to surface imperfections and manufacturing tolerances and variations, the present invention is not limited or governed by such parameters. Moreover, the "floating" secondary accelerator ring 110 is not limited for use with a primary accelerator ring 102, and may find advantageous application alone in smaller diameter, light load application or even in multiple grouping for larger diameter systems.

In this respect, the present invention has been described with respect to a preferred embodiment. Modifications and alterations may occur to those skilled in the art upon a reading and understanding of the specification. It is intended that all such modification sand alterations be included insofar as they come within the scope of the appended claims of the equivalents thereof.

Having thus described the invention, the following is claimed:

1. A seal assembly for a carrier propelled through a tube in a pneumatic tube system, said tube having an inner surface which defines an inner profile of said tube, comprising:

at least one stationary seal element fixedly mounted to said carrier, said stationary seal element having an outer peripheral profile which is dimensioned to conform to and be smaller than the inner profile defined by the inner surface of said tube, and at least one floating seal element mounted to said carrier for lateral movement relative thereto, said floating seal element having an outer peripheral profile which is dimensioned to conform in shape to the inner profile defined by the inner surface of said tube and which is larger in perimeter than the outer peripheral profile of said stationary seal element and smaller in perimeter than the inner profile defined by the inner surface of the tube.

2. A seal assembly as defined in claim 1 wherein said carrier is generally cylindrical in shape.

3. A seal assembly as defined in claim 2 wherein said floating seal element is a generally flat annular ring.

4. A seal assembly as defined in claim 3 wherein said flat annular ring includes an annular inner edge disposed within an annular slot formed within said carrier.

5. A seal assembly for sealing the periphery of a circular cylindrical carrier adapted to be propelled by pneumatic means through a cylindrical tube having a nominal standard inner diameter, said seal arrangement comprising:
   at least one stationary ring fixedly mounted to said carrier, said stationary ring having an outer annular diameter at most equal a smallest circular opening defined by said tube, said smallest circular opening being an opening defined by a circle having a diameter equal to the nominal standard inner diameter of said tube less a manufacturer's tolerance for said tube and less a manufacturer's dimension by which said tube may be out-of-round, and
   at least one floating ring mounted to said carrier for lateral movement relative thereto, said floating ring having an outer diameter equal to or less than the nominal inner diameter of said tube less a manufacturer's tolerance, but greater than said outer diameter of said stationary ring, said floating ring being movable relative to said carrier in a plan perpendicular to the central axis of said carrier.

6. A seal assembly as defined in claim 5 wherein said floating ring is a flat annular element having an annular inner edge, said annular inner edge disposed within slot formed within said carrier.

7. A seal assembly as defined in claim 6 wherein said floating ring has a range of travel relative to said carrier which is sufficient to ensure that the weight of said carrier is borne by said stationary ring as said carrier is conveyed through said tube.

8. A seal assembly as defined in claim 6 wherein said floating ring is deformable and may assume an oval configuration.

9. An article carrier adapted to be propelled through a transfer tube in a pneumatic transfer system, said tube having an inner surface defining a profile of said tube, said carrier comprised of:
   a tubular body portion having an outer surface which is generally symmetrical about a central axis, said body portion defining an article-carrying chamber therein,
   an outward opening slot formed on the outer surface of said body portion about the periphery thereof, said slot oriented in a plane generally perpendicular to said central axis of said body portion,
   a continuous seal member surrounding said body portion operable to form a pneumatic seal about said body portion in said tube, said seal member having an outer peripheral edge dimensioned to generally conform to the profile of the inner surface of said transfer tube and an inner edge dimensioned to be received within said slot wherein said seal member is laterally movable relative to the central axis of said body portion,
   a stationary seal member fixedly mounted to said body and being stationary relative thereto, said stationary seal member having an outer peripheral edge dimensioned to conform generally to the profile of the inner surface of said transfer tube ant to be smaller in perimeter than the outer peripheral edge of said movable seal member.

10. An article carrier as defined in claim 9 wherein said movable seal member has a range of travel relative to said body portion which is at least equal to the difference between an outer diameter of said movable seal member and an outer diameter of said stationary seal member.

11. An article carrier as defined in claim 9 wherein said tubular body portion is cylindrical in shape and said slot has an annular shape which extends around said body portion.

12. An article carrier as define in claim 11 wherein said seal member is an annular ring.

13. A carried for use in pneumatic transfer systems for carrying loads through a cylindrical passage in an elongated transfer tube, said transfer tube having an inner surface of predetermined diameter defining said passage, said carrier comprising:
   a generally cylindrical tubular body symmetrical about a central axis, said body having an outer facing external surface and an inner cavity for containing articles to be transferred, and
   at least one stationary accelerator ring positioned on the external surface of said carrier extending radially outward from said external surface, said at least one stationary accelerator ring being circular and dimensioned to have an outer diameter less than the diameter defining said passage of said transfer tube, said at least one stationary accelerator ring being fixedly mounted to said tubular body and being stationary with respect to said central axis of said tubular body,
   at least one circular floating accelerator ring which extends radially outward from said body having an outer diameter larger than outer diameter of said at least one stationary accelerator ring, and
   means for mounting said floating accelerator ring on said carrier such that said floating accelerator ring is capable of moving laterally with respect to the central axis of the carrier.

14. A carrier as defined in claim 13 wherein said floating accelerator ring has a range of motion on said carrier such that the weight of said carrier is borne by said stationary accelerator ring as said carrier is conveyed through said tube.

15. A carrier as defined in claim 13 wherein said stationary accelerator ring is dimensioned to pass through the smallest opening defined by said transfer tube.

16. A carrier as defined in claim 13 wherein said floating accelerator ring is a generally flat circular element and is formed of a resilient pliable material.

17. A carrier as defined in claim 13 wherein said means for mounting said floating accelerator ring is an annular slot formed within said body portion which is dimensioned to receive the inner edge of said floating accelerator ring therein.

18. An accelerator ring assembly for use on an article carrier used in a pneumatic transfer system, said system including a transfer tube defining a passage through which said carrier is propelled, said passage has a profile having a perimeter and is defined by an inner surface of said tube, said assembly comprising:
   at least one stationary accelerator ring on said carrier extending about the periphery thereof, said stationary accelerator ring having an outer peripheral edge with a profile dimensioned to conform generally to the profile of the passage define by said transfer tube and to have a perimeter smaller than the perimeter of the profile of said passage, said stationary accelerator ring being fixedly mounted to said carrier and being stationary relative to a central axis of said carrier, at least one floating accelerator ring on said carrier having an outer peripheral edge with a profile dimensioned to conform to the profile of said passage defined by said transfer tube, said profile of said outer peripheral edge of said floating ring having a perimeter dimensioned to be larger than said perimeter of said profile of said outer peripheral edge of said stationary accelerator ring, and means for mounting said floating accelerator ring on said carrier such that said floating accelerator ring is capable of moving laterally relative to the central axis of said 19. An accelerator ring assembly as define in claim 18 wherein said carrier is generally cylindrical in shape and said stationary accelerator ring and said floating accelerator ring are annular in shape.

* * * * *